US 11,870,868 B2

(12) United States Patent
Tanaka et al.

(10) Patent No.: US 11,870,868 B2
(45) Date of Patent: Jan. 9, 2024

(54) COMMON STORAGE MANAGEMENT DEVICE AND COMMON STORAGE MANAGEMENT METHOD

(71) Applicant: DENSO CORPORATION, Kariya (JP)

(72) Inventors: Yusuke Tanaka, Kariya (JP); Yuka Ito, Kariya (JP); Hajime Nomura, Kariya (JP); Daishi Miyata, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/485,568

(22) Filed: Sep. 27, 2021

(65) Prior Publication Data
US 2022/0103650 A1 Mar. 31, 2022

(30) Foreign Application Priority Data
Sep. 30, 2020 (JP) .................................. 2020-165365

(51) Int. Cl.
*G06F 3/06* (2006.01)
*H04L 67/5651* (2022.01)
*H04L 67/04* (2022.01)

(52) U.S. Cl.
CPC ........ *H04L 67/5651* (2022.05); *G06F 3/0608* (2013.01); *G06F 3/0638* (2013.01); *G06F 3/0673* (2013.01); *H04L 67/04* (2013.01)

(58) Field of Classification Search
CPC ...... G05B 13/00–048; G05B 15/00–02; G05B 17/00–02; G06F 1/00–3296;
(Continued)

(56) References Cited
U.S. PATENT DOCUMENTS 9,277,370 B2* 3/2016 Addepalli ............... H04L 67/60
2006/0015231 A1* 1/2006 Yoshimura ............ B60L 3/0076
701/1

(Continued)

FOREIGN PATENT DOCUMENTS

JP 2018-206454 A 12/2018

OTHER PUBLICATIONS

R. Miucic, S. M. Mahmud and Z. Popovic, "An Enhanced Data-Reduction Algorithm for Event-Triggered Networks," in IEEE Transactions on Vehicular Technology, vol. 58, No. 6, pp. 2663-2678, Jul. 2009, doi: 10.1109/TVT.2008.2011361. (Year: 2009).*
J. Huang, M. Zhao, Y. Zhou and C.-C. Xing, "In-Vehicle Networking: Protocols, Challenges, and Solutions," in IEEE Network, vol. 33, No. 1, pp. 92-98, Jan./Feb. 2019, doi: 10.1109/MNET.2018.1700448. (Year: 2019).*

(Continued)

*Primary Examiner* — Daniel C. Chappell
(74) *Attorney, Agent, or Firm* — Harness, Dickey & Pierce, P.L.C.

(57) ABSTRACT

A common storage management device for a system including a common storage and at least one computer includes at least one processor, the at least one computer storing a plurality of applications configured to write and read data in the common storage. The at least one processor is configured to manage a reservation of a storage space of the common storage in response to a request from the plurality of applications to reserve the storage space for storing the data. The at least one processor is configured to notify one application of the plurality of applications of a request to reduce data size of the data for which the storage space is required to be reserved per one request, when the one application requests to reserve the storage space for the data and free storage space is insufficient for reserving the storage space for the data.

7 Claims, 3 Drawing Sheets

(58) Field of Classification Search
CPC ............... G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06K 9/00–6298; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 27/00–3293; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | | |
|---|---|---|---|---|
| 2007/0105542 A1* | 5/2007 | Friedman | ................ | H04W 4/00 |
| | | | | 455/420 |
| 2010/0332072 A1* | 12/2010 | Ishiko | ................... | B60T 17/221 |
| | | | | 701/29.5 |
| 2014/0101375 A1* | 4/2014 | Thatcher | ............... | G06F 3/0604 |
| | | | | 711/103 |
| 2016/0162218 A1* | 6/2016 | Callaway | ................ | G06F 3/067 |
| | | | | 707/692 |
| 2017/0278320 A1* | 9/2017 | Isozaki | .................. | G07C 5/085 |
| 2017/0288951 A1* | 10/2017 | Kurauchi | ............ | H04L 43/0811 |
| 2018/0373458 A1* | 12/2018 | Kim | ...................... | G06F 3/0613 |
| 2020/0005829 A1* | 1/2020 | Hasegawa | ............... | B60R 16/00 |
| 2020/0050442 A1* | 2/2020 | Sakurai | ................... | H04L 67/12 |

OTHER PUBLICATIONS

S. Kelkar and R. Kamal, "Boundary of Fifteen Compression algorithm for Controller Area Network based automotive applications," 2014 International Conference on Circuits, Systems, Communication and Information Technology Applications (CSCITA), Mumbai, India, 2014, pp. 162-167 (Year: 2014).*

J. H. Kim, S.-H. Seo, N.-T. Hai, B. M. Cheon, Y. S. Lee and J. W. Jeon, "Gateway Framework for In-Vehicle Networks Based on CAN, FlexRay, and Ethernet," in IEEE Transactions on Vehicular Technology, vol. 64, No. 10, pp. 4472-4486, Oct. 2015, doi: 10.1109/TVT.2014.2371470. (Year: 2015).*

* cited by examiner

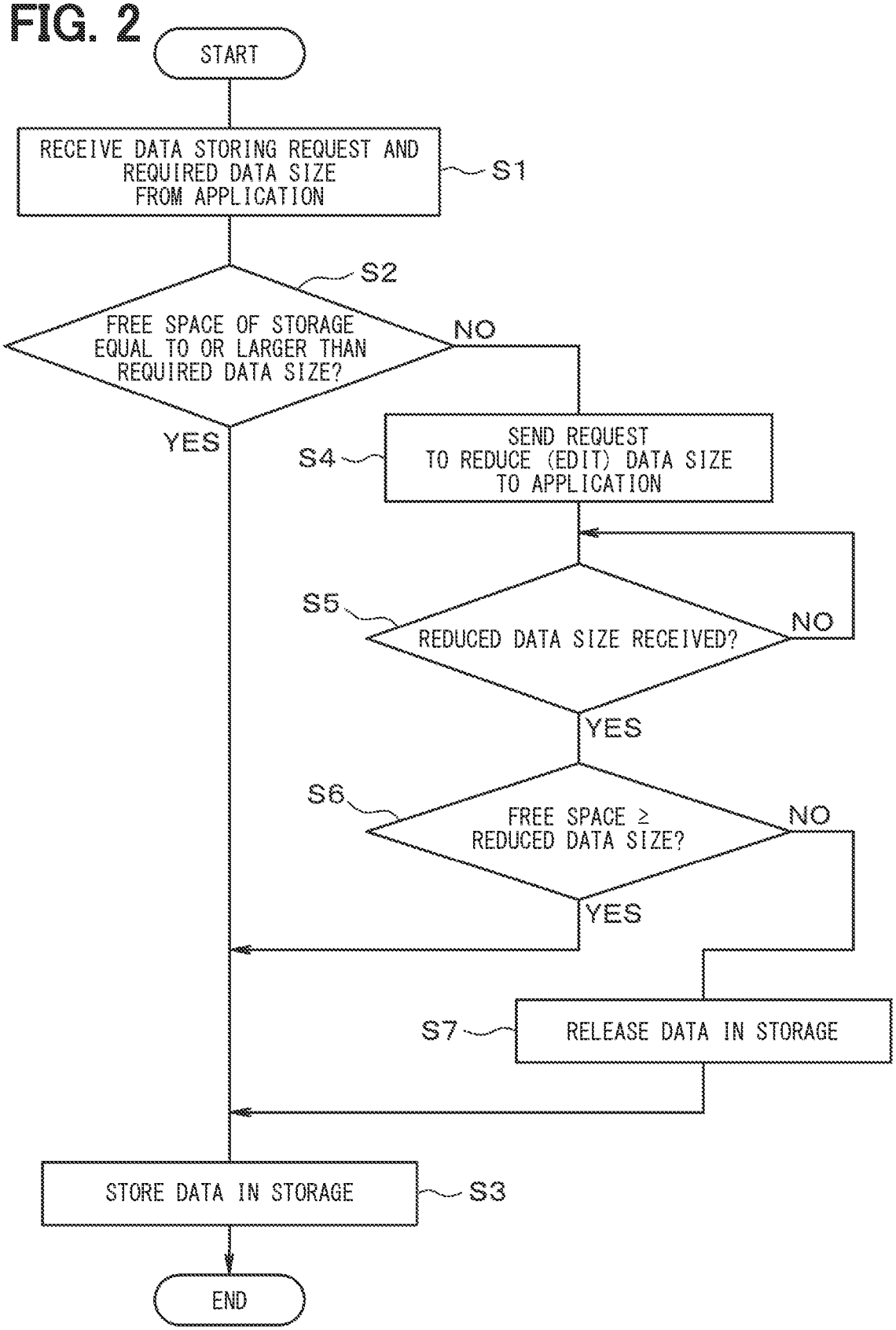

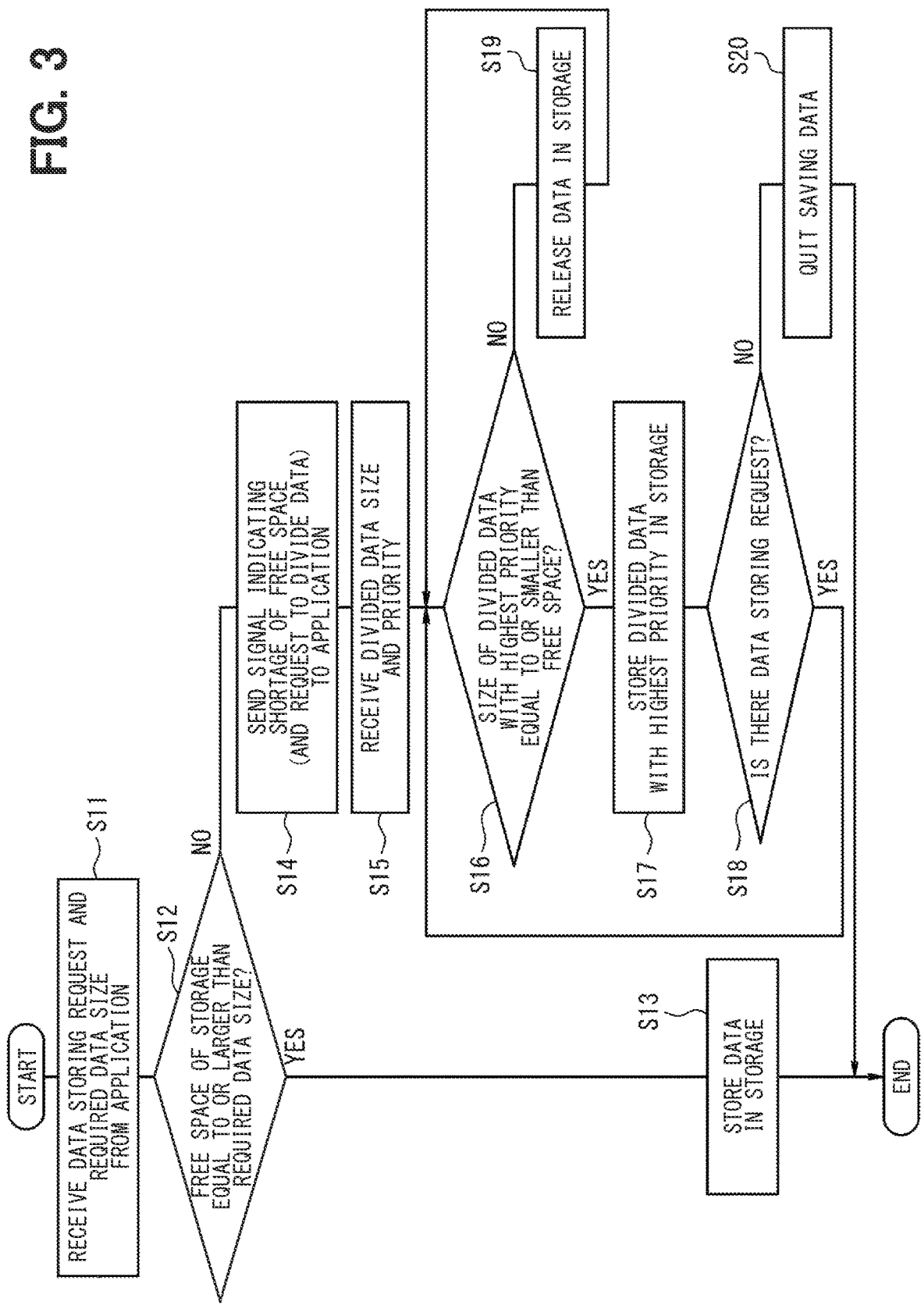

COMMON STORAGE MANAGEMENT DEVICE AND COMMON STORAGE MANAGEMENT METHOD

CROSS REFERENCE TO RELATED APPLICATION

This application is based on and incorporates herein by reference Japanese Patent Application No. 2020-165365 filed on Sep. 30, 2020.

TECHNICAL FIELD

The present disclosure relates to a common storage management device and a common storage management method for a system installed in a vehicle such as an automobile.

BACKGROUND

A vehicle such as an automobile is equipped with a system including electronic devices called ECUs (Electronic Control Units), which include computers, connected with each other through a network using CAN, Ethernet, etc. Applications are provided in each ECU, and information is exchanged between the applications. The ECUs include a communication device configured to communicate with the outside of the vehicle to perform data communication with an external device. For example, the data of the drive recorder is uploaded to the cloud, or update programs and various data are downloaded from outside.

The applications temporarily uses storage space for uploading and downloading data, but preparing a dedicated storage space in each ECU may be wasteful. In view of the above points, a common storage may be provided in one ECU, and the applications may write and delete data to and from the common storage at any given time.

SUMMARY

According to a first aspect of the present disclosure, a common storage management device is configured to be used for a system including a common storage and at least one computer connected with each other by a closed network. The at least one computer includes one computer configured to communicate with an outside. The at least one computer stores a plurality of applications configured to communicate with each other. The plurality of applications are configured to write and read data in the common storage. The common storage management device includes at least one processor configured to manage a reservation of a storage space of the common storage in response to a request from the plurality of applications to reserve the storage space for storing the data. The at least one processor is configured to notify one application of the plurality of applications of a request to reduce data size of the data for which the storage space is required to be reserved per one request, when the one application requests to reserve the storage space for the data and free storage space is insufficient for reserving the storage space for the data.

According to a second aspect of the present disclosure, a method of managing a common storage is used for a system including the common storage and at least one computer connected with each other by a closed network. The at least one computer includes one computer configured to communicate with an outside. The at least one computer stores a plurality of applications configured to communicate with each other. The plurality of applications are configured to write and read data in the common storage. The method includes reserving a storage space of the common storage in response to a request from the plurality of applications to reserve the storage space for storing the data. The method includes notifying one application of the plurality of applications of a request to reduce data size of the data for which the storage space is required to be reserved per one request, when the one application requests to reserve the storage space for the data and free storage space is insufficient for reserving the storage space for the data.

According to a third aspect of the present disclosure, a common storage management device is configured to be used for a system including a common storage and a plurality of electronic control devices connected with an in-vehicle network. Each of the plurality of electronic control devices are configured to execute at least one application. The at least one application is configured to write and read data in the common storage. The common storage management device includes at least one processor configured to manage a reservation of a storage space of the common storage in response to a request from the at least one application to reserve the storage space for storing the data. The at least one processor is configured to notify the at least one application of a request to reduce data size of the data for which the storage space is required to be reserved per one request, when the at least one application requests to reserve the storage space for the data and free storage space is insufficient for reserving the storage space for the data.

BRIEF DESCRIPTION OF THE DRAWINGS

FIG. 2 is a flowchart illustrating processes performed by a storage manager to reserve a storage space.

FIG. 3 is a flowchart illustrating processes performed by a storage manager to reserve a storage space for a divided data, according to a second embodiment.

DETAILED DESCRIPTION

Figure 1:
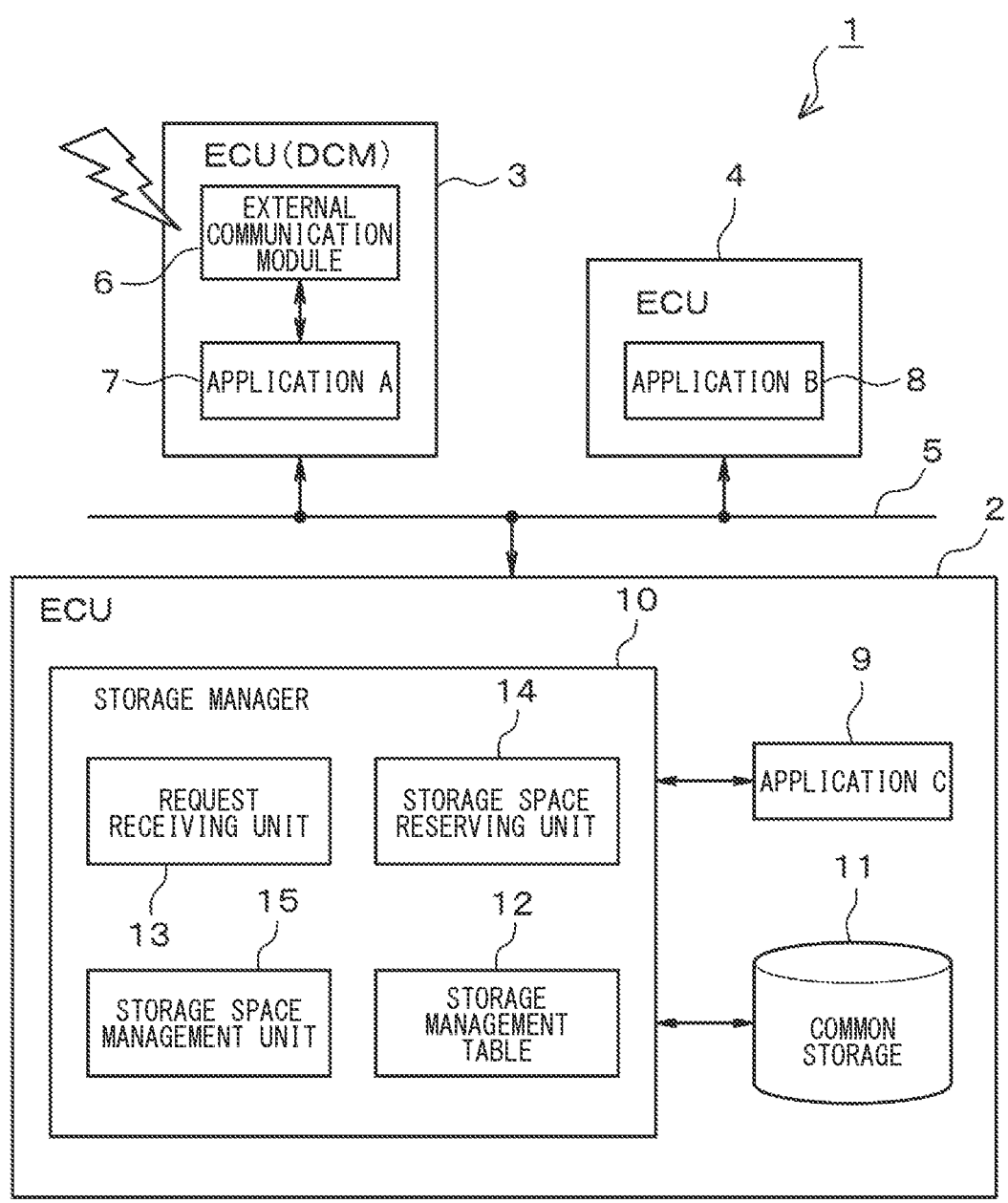
FIG. 1 is a block diagram illustrating an in-vehicle system according to a first embodiment.

In a comparative example of the present disclosure, when recording data in a storage, a storage having a free space is determined from multiple storages provided in the system, and the data is recorded in the determined storage. In this way, the multiple storages can be utilized as if the multiple storages are one storage.

After the uploading or the downloading of the data using the common storage is completed, the application determines that the data is no longer needed and performs a process of deleting the data from the common storage. When the common storage is shared by the applications and the use of the common storage is concentrated, the common storage may not be used due to lack of free storage space even when another application tries to use the common storage. In this case, the common storage can be used after the use by the application ends and the storage space is released, but the efficiency of using the common storage may deteriorate.

Embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Hereinafter, a common storage management device provided in an in-vehicle system mounted on a vehicle such as an automobile according to a first embodiment will be described with reference to FIGS. 1, 2. FIG. 1 schematically shows configurations of an in-vehicle system 1 according to the present embodiment. The in-vehicle system 1 includes multiple ECUs (Electronic Control Units) 2, 3, 4 connected with each other through network 5 such as CAN (registered trademark) and Ethernet (registered trademark). Each ECUs includes a computer. In FIG. 1, three ECUs 2, 3, 4 are illustrated for convenience.

The ECU 3 is an ECU for controlling communication with the outside of the vehicle. The ECU 3 includes an external communication module 6 referred to as a DCM (Data Communication Module) and an application 7. The ECU 4 is an ECU for controlling various in-vehicle devices. The ECU 4 includes, for example, an ECU for driving control such as engine control, an ECU for body system control, an ECU for navigation control, an ECU for ETC control, an ECU for audio control, and an ECU for drive recorder control. The ECU 4 includes an application 8.

The ECU 2 is an ECU for a central gateway and functions as a hub in the network of the in-vehicle system 1. The ECU 2 includes an application 9. Each ECU 2, 3, 4 may include multiple applications. In the present embodiment, the ECU 2 functions as the common storage management device. In FIG. 1, the application 7 is denoted as "application A", the application 8 is denoted as "application B", and the application 9 is denoted as "application C".

In the in-vehicle system 1 of the present embodiment, the applications 7, 8, 9 of the ECUs 2, 3, 4 communicate with each other, and the external communication module 6 communicate with a center device of an external service company or the like through a communication network. In this case, the applications 7, 8, 9 of the ECUs 2, 3, 4 upload to and download from the center device.

Specifically, information transmitted to the center device includes diagnostic data detected by sensors mounted on the vehicle, image data of a drive recorder, and the like. Information received from the center device includes update programs of software for the in-vehicle devices, map data for navigation that is updated at any given time among information referenced by in-vehicle devices, and music data played by audio devices.

The applications 7, 8, 9 temporarily uses storage space for uploading and downloading data, but preparing a dedicated storage space in each ECU 2, 3, 4 may be wasteful. In view of the above, a common storage 11 is provided in one ECU. In this embodiment, the common storage 11 is provided in the ECU 2. The applications 7, 8, 9 write data to the common storage 11 and delete data from the common storage 11 at any given time.

The functions of the ECU 2 as the common storage management device will be described. As described above, the ECU 2 includes the common storage 11. The ECU 2 further includes a storage manager 10 configured to reserve and release the storage space of the common storage 11 in response to requests by the applications 7, 8, 9. The storage manager 10 includes a storage management table 12 configured to record current usage status of the common storage 11. In the present embodiment, the storage management table 12 is configured to record management information containing the application that requested the reservation of the common storage 11 and the volume of the reserved storage space.

The storage manager 10 is configured to realize functions as a request receiving unit 13, a storage space reserving unit 14, and a storage space management unit 15 by its hardware and software configurations. The request receiving unit 13 is configured to perform processes for receiving a request to reserve or release the storage space of the common storage 11 from the applications 7, 8, 9. The storage space reserving unit 14 is configured to reserve the storage space of the common storage 11 in accordance with the request to reserve the storage space received by the request receiving unit 13.

As described later in the description of the operation, the storage space reserving unit 14 is configured to inquire the storage space management unit 15 of the volume of the free space of the common storage 11 in order to reserve the storage space. The storage space management unit 15 is configured to refer to the storage management table 12 and determine whether the required storage space of the common storage 11 can be reserved. When the common storage 11 has sufficient free storage space, the storage space reserving unit 14 performs processes for reserving the storage space. However, when the usage of the common storage 11 by the applications 7, 8, 9 is concentrated, the free storage space of the common storage 11 may be insufficient to reserve the required storage space requested by another applications 7, 8, 9.

Accordingly, when the storage space management unit 15 determines that the free storage space of the common storage 11 is insufficient for the required storage space, the storage space management unit 10 notifies the application 7, 8, 9 that is requesting the reservation of the storage space of a request to reduce the data size per one request. The reduction of the data size includes editing the data for which the storage space is reserved and dividing the data. Editing the data includes data compression, data thinning, and data format changes such as conversion from bitmap to JPEG. The one request is a request to reserve the storage space for the divided data when the parent data is divided into multiple divided data.

The application 7, 8, 9 that is requested to reduce the data size performs processes to reduce size of the data requesting the reservation of the storage space such as data compression and dividing the data into multiple divided data. Subsequently, the application 7, 8, 9 requests the storage manager 10 to reserve the storage space of the common storage 11 again. The storage manager 10 performs the above-described processes each time the storage manager 10 receives the request from the applications 7, 8, 9.

At this time, since the application 7, 8, 9 performed the processes for reducing the required data size, the free storage space for the edited data or a part of the divided data may be reserved and the data may be stored. When it is determined that the storage space required for the edited data or the divided data can be reserved in the free storage space of the common storage 11, the processes for reserving the storage space for the data are performed. When the free space in the common storage 11 is insufficient even for the reduced data, the processes are performed after the usage by another application 7, 8, 9 ends to release the storage space. The storage space management unit 15 is configured to rewrite the management information in the storage management table 12 after completing the processes for reserving and releasing the storage space.

Next, the processes performed by the storage manager 10 will be described with reference to FIG. 2. Here, a case where the free space is insufficient and the data is edited as the data reduction will be described as an example. The flowchart in FIG. 2 shows processes performed by the storage manager 10 for reserving the storage space, and the common storage management method of the present embodiment is performed by the processes.

In step S1 in FIG. 2, the request to reserve the storage space and the required data size are received from the application 7, 8, 9. In step S2, it is determined whether the common storage 11 has enough free space equal to or greater than the required data size requested by the application 7, 8, 9. When it is determined that the common storage 11 has the enough free space (Yes in step S2), the required storage space of the common storage 11 is reserved and the data is stored by the application 7, 8, 9 in step S3.

In contrast, when it is determined in step S2 that the common storage 11 does not have the enough free space (No in step S2), the application 7, 8, 9 that sent the request is notified of the request to reduce the data size (to edit the data in this example). As described above, the application 7, 8, 9 received the notification performs the data reduction such as data compression, data thinning, and data format change, and requests again to reserve the storage space. For example, when the image data of the drive recorder is uploaded, one hour's worth of data can be compressed to about half by editing the data. In next step S5, it is determined whether the reduced data size is received from the application 7, 8, 9.

When the reduced data size is received from the application 7, 8, 9 (Yes in step S5), it is determined whether the common storage 11 has the free space equal to or greater than the required data size reduced by the application 7, 8, 9 in step S6. When it is determined that the common storage 11 has the enough free space (Yes in step S6), the required storage space of the common storage 11 is reserved and the data is stored by the application 7, 8, 9 in step S3. When it is determined that the common storage 11 does not have the enough free space (No in step S6), and the process proceeds to step S3 after the usage of the common storage 11 by another application 7, 8, 9 ends and the storage space is released in step S7.

According to the common storage management device and the common storage management method of the present embodiment, the following operations and effects can be obtained. That is, the storage manager 10 is configured to manage the reservation of the storage space of the common storage 11 in response to the request by the application 7, 8, 9. When the usage of the common storage 11 by the applications 7, 8, 9 is concentrated, the free storage space of the common storage 11 may be insufficient to reserve the required storage space requested by another application 7, 8, 9. Even when it is determined that the free storage space is insufficient, the storage space may be reserved to store the data of one request after the application 7, 8, 9 performs the reduction of the data size.

When the reservation of the storage space is requested by the application 7, 8, 9 and the free storage space of the common storage 11 for the data is insufficient, the storage manager 10 notifies the application 7, 8, 9 of the request to reduce the data size per the one request. Accordingly, the storage space can be reserved in response to the request from the application 7, 8, 9 without waiting for additional free storage space of the common storage 11 occurring due to the end of the processes by another application 7, 8, 9. As a result, according to the present embodiment, the storage space of the common storage 11 can be used efficiently in the system including the common storage 11 shared with the applications 7, 8, 9.

Especially, in the present embodiment, the applications 7, 8, 9 are configured to reduce the data size per one request by editing the data to be stored. The data size of the parent data may be reduced sufficiently, e.g. by 50%, by data compression, data thinning, data format changing. In the present embodiment, since the storage manager 10 includes the storage management table 12 that records current usage status of the common storage 11, it can be determined whether there is sufficient free storage space by referring to the storage management table 12.

Second Embodiment and Other Embodiments

Next, a second embodiment will be described with reference to FIG. 3. The second embodiment is different from the first embodiment in the processes for reserving the storage space of the common storage 11 performed by the storage manager 10. In the present embodiment, the applications 7, 8, 9 are configured to divide the data to reduce the required data size per one request. First, as in the first embodiment, when the request to reserve the storage space and the required data size are received from the application 7, 8, 9 in step S11, it is determined whether the common storage 11 has the free storage space equal to or greater than the required data size requested by the application 7, 8, 9 in step S12.

When it is determined that the common storage 11 has the free storage space to reserve the storage space with the required data size requested by the application (Yes in step S12), the required storage space of the common storage 11 is reserved and the data is stored by the application 7, 8, 9 in step S13. In contrast, when it is determined in step S12 that the common storage 11 does not have the free storage space for reserving the storage space having the required data size (No in step S12), the application 7, 8, 9 that sent the request is notified of the request to reduce the data per one request (divide the data in the present embodiment) in step S14.

The application 7, 8, 9 that received the notification divides the data, assigns a storage priority to each divided data, and make another reserving request. For example, when the image data of the drive recorder is uploaded, one hour's worth data may be divided into three divided data of 20 minutes each, and the priority 1, 2, 3 may be given in order from the oldest data. In next step S15, the required data size and the priority of each divided data are received from the application 7, 8, 9.

In next step S16, it is determined whether the data size of the divided data having the highest priority at the time is equal to or less than the free storage space of the common storage 11. When the data size is equal to or less than the free storage space (Yes in step S16), the storage space of the common storage 11 required for the divided data having the highest priority is reserved and the application 7, 8, 9 stores the divided data in step S17. In next step S18, it is determined whether there is the request to store the divided data. When there remains the request to store the divided data (Yes in step S18), the processes from step S16 are repeated.

In contrast, it is determined in step S16 that the data size of the divided data having the highest priority at the time exceeds the free storage space of the common storage 11 (No in step S16), the application 7, 8, 9 waits for the end of the use of the common storage 11 by another application 7, 8, 9 in step S19, and the process returns to step S16. In this way, the reservation of the storage space of the common storage 11 required for the divided data and the saving of the divided data are completed (No in step S18), the reservation of the storage space and the saving of the divided data end in step S20.

According to the second embodiment, as in the first embodiment, the storage space of the common storage 11 can be used efficiently in the system including the common storage 11 shared with the applications 7, 8, 9. In addition, the storage manager 10 is configured to perform the processes for reserving the storage space in accordance with the priority of each divided data in response to the request from the application 7, 8, 9 to reserve the storage space for the divided data. As a result, the reservation of the storage space of the common storage 11 and the saving of the divided data can be quickly performed for at least some of the divided data. Especially, in the present embodiment, the divided data can be stored in order of the priority, and the storage space for all the divided data can be reserved and all the divided data can be stored.

In the above-described embodiments, the ECU 2 for the central gateway includes the common storage 11 and has the function of the storage manager 10. However, another ECU may have the common storage 11 and that function instead of the ECU 2. In the above-described embodiment, the present disclosure is explained with an example using the in-vehicle system 1 in which the ECUs are connected with each other through the network. However, the present disclosure may be used for any system including one or more computers in a closed network.

Although the present disclosure has been described in accordance with embodiments, it is understood that the present disclosure is not limited to such embodiments or structures. The present disclosure encompasses various modifications and variations within the scope of equivalents. In addition, various combinations and forms, and further, other combinations and forms including only one element, or more or less than these elements are also within the sprit and the scope of the present disclosure.

Although the present disclosure has been fully described in connection with the preferred embodiments thereof with reference to the accompanying drawings, it is to be noted that various changes and modifications will become apparent to those skilled in the art.

Additional advantages and modifications will readily occur to those skilled in the art. The disclosure in its broader terms is therefore not limited to the specific details, representative apparatus, and illustrative examples shown and described.

What is claimed is:

1. A common storage management device for a system including a common storage and at least two computers connected with each other by a closed network, the at least two computers including one computer configured to communicate with an outside computer, the at least two computers storing a plurality of applications configured to communicate with each other while executing on the at least two computers, the plurality of applications being configured to write data to and read data from the common storage, the common storage management device comprising:
at least one processor configured to
manage a reservation of a first storage space of the common storage in response to a first request from a first application of the plurality of applications executing on the at least two computers to reserve the first storage space of the common storage for storing first data, and
notify the first application of the plurality of applications of a second request from the common storage management device to reduce data size of the first data for which the first storage space is required to be reserved in response to the second request, when the first application requests to reserve the first storage space for the first data and free storage space of the common storage is insufficient for reserving the first storage space for the first data.

2. The common storage management device according to claim 1, wherein
the at least one processor is configured to notify the first application of a request to edit or divide the first data to reduce the data size in response to the second request.

3. The common storage management device according to claim 2, wherein
when reservations of the first storage space for storage of chunks of data corresponding to divided pieces of the first data are requested after notifying the first application of the second request to reduce the data size in response to the second request, the at least one processor reserves the storage space in order of a priority assigned by the first application to the divided pieces of the first data.

4. The common storage management device according to claim 3, wherein
the at least one processor is configured to repeatedly reserve an individual storage space in order to reserve storage spaces for all of the divided pieces of the first data.

5. A method of managing a common storage for a system including the common storage and at least two computers connected with each other by a closed network, the at least two computers including one computer configured to communicate with an outside computer, the at least two computers storing a plurality of applications configured to communicate with each other while executing on the at least two computers, the plurality of applications being configured to write data to and read data from the common storage, the method comprising:
reserving a first storage space of the common storage in response to a first request from a first application of the plurality of applications executing on the at least two computers to reserve the first storage space of the common storage for storing first data; and
notifying the first application of the plurality of applications of a second request to reduce data size of the first data for which the first storage space is required to be reserved in response to the second request, when the first application requests to reserve the first storage space for the first data and free storage space of the common storage is insufficient for reserving the first storage space for the first data.

6. A common storage management device for a system including a common storage and a plurality of electronic control devices connected with an in-vehicle network, each of the plurality of electronic control devices being configured to execute at least one application, the at least one application being configured to write data to and read data from the common storage, the common storage management device comprising:
at least one processor configured to:
manage a reservation of a first storage space of the common storage in response to a first request from the at least one application to reserve the first storage space for storing first data to the common storage; and notify the at least one application of a second request from the common storage management device to reduce data size of the first data for which the first storage space is required to be reserved in response to the second request, when the at least one application requests to reserve the first storage space for the first data and free storage space of the common storage is insufficient for reserving the first storage space for the first data.

7. A common storage management device for a system including a common storage and a plurality of electronic control devices connected with an in-vehicle network, each of the plurality of electronic control devices being configured to execute at least one application, the at least one application being configured to write data to and read data from the common storage, the common storage management device comprising:

at least one processor configured to:

receive a first request from the at least one application to reserve and release the first storage space of the common storage for storing first data;

manage a reservation of the first storage space of the common storage in response to the first request;

notify the at least one application of a second request to reduce data size of the first data for which the first storage space of the common storage is required to be reserved in response to the second request, when the at least one application requests to reserve the first storage space for the first data and free storage space of the common storage is insufficient for reserving the first storage space for the first data; and determine whether the free storage space of the common storage is sufficient to reserve a second storage space for storing the first data to the common storage whose data size is reduced in response to the second request when the at least one application requests to reserve the second storage space of the common storage for the first data after reducing the data size of the first data.

* * * * *